United States Patent
Park (10) Patent No.: US 11,383,455 B2
(45) Date of Patent: Jul. 12, 2022

(54) THREE-DIMENSIONAL STRUCTURE AND MANUFACTURING METHOD OF THE SAME

(71) Applicant: Airbible Co., Ltd., Cheongju-si (KR)

(72) Inventor: Won Seok Park, Daejeon (KR)

(73) Assignee: AIRBIBLE CO., LTD., Hungcheongbuk-Do (KR)

( * ) Notice: Subject to any disclaimer, the term of this patent is extended or adjusted under 35 U.S.C. 154(b) by 0 days.

(21) Appl. No.: 17/176,184

(22) Filed: Feb. 16, 2021

(65) Prior Publication Data

US 2021/0379841 A1 Dec. 9, 2021

(30) Foreign Application Priority Data

Jun. 3, 2020 (KR) ........................ 10-2020-0066984

(51) Int. Cl.
*B29C 65/00* (2006.01)

(52) U.S. Cl.
CPC .... *B29C 66/82661* (2013.01); *B29C 66/0242* (2013.01); *B29C 66/0326* (2013.01)

(58) Field of Classification Search
CPC .......... B29C 66/82661; B29C 66/0326; B29C 66/0242; B29C 33/00; B29C 65/00
See application file for complete search history.

(56) References Cited

U.S. PATENT DOCUMENTS

| | | | |
|---|---|---|---|
| 5,125,994 A * | 6/1992 | Harasta | ................... B29C 71/02 156/212 |
| 6,305,641 B1 | 10/2001 | Onda | |
| 2013/0037549 A1 * | 2/2013 | Martin | .............. B29C 66/73921 903/902 |
| 2018/0036967 A1 * | 2/2018 | Deck | ....................... B29C 70/541 |
| 2019/0152149 A1 | 5/2019 | Arayama | |

FOREIGN PATENT DOCUMENTS

| | | |
|---|---|---|
| JP | 1020822 A | 1/1998 |
| JP | 3076842 B1 | 8/2000 |
| KR | 1020110124639 A | 11/2011 |
| KR | 10-1610694 B1 | 4/2016 |
| KR | 101610694 B1 | 4/2016 |
| WO | 2017/078168 A1 | 5/2017 |

OTHER PUBLICATIONS

Machine Translation of KR10-1610694 (Year: 2016).*
Korean Office Action for KR Application No. 10-2020-0066984 dated Jul. 14, 2020, citing the above reference(s).
Japanese Office Action for JP Application No. 2021-023086 dated Feb. 22, 2022 citing the above reference(s).

* cited by examiner

*Primary Examiner* — Daniel McNally (74) *Attorney, Agent, or Firm* — Cantor Colburn LLP (57) ABSTRACT

According to an embodiment of the present disclosure, a method for manufacturing a 3D structure includes: making a plurality of single piece molds having a same surface shape as a portion of a surface of the 3D structure; making a plurality of exterior members having the same surface as the portion of the surface of the 3D structure by using the respective single piece molds; and forming the 3D structure by connecting the plurality of exterior members.

7 Claims, 12 Drawing Sheets

THREE-DIMENSIONAL STRUCTURE AND MANUFACTURING METHOD OF THE SAME

CROSS-REFERENCE TO RELATED APPLICATIONS

This application is based on and claims priority under 35 U.S.C. § 119 to Korean Patent Application No. 10-2020-0066984, filed on Jun. 3, 2020, in the Korean Intellectual Property Office, the disclosure of which is herein incorporated by reference in its entirety.

BACKGROUND

1. Field

The present disclosure relates to a three-dimensional (3D) structure, and more particularly, to a method for manufacturing a 3D structure which can float in the air and a 3D structure manufactured by the same method.

2. Description of the Related Art

Various 3D structures are utilized in department stores, exhibition halls for the purposes of advertising and enhancing aesthetic characteristics. 3D structures installed in the air of a large space may attract visitors' attention along with 3D structures installed on the ground. A 3D structure installed in the air may be connected to a fixing cable extended from a ceiling, and recently, such 3D structures are being replaced with 3D structures floating in the air by using helium gas due to space constraint, a problem of appearance.

A 3D structure may be manufactured with an exterior member having a hollow formed therein and formed with a light material to be able to float in the air by using helium gas, but there is a problem that it is difficult to keep balance or to adjust a position of the structure in the air. In addition, it is difficult to implement a motion although the structure is installed to float in the air, and thus availability of the structure may be degraded. Accordingly, there is a demand for a floating 3D structure which can easily adjust its balance and is easy to move, and can implement a motion, and a manufacturing method thereof.

SUMMARY

The present disclosure has been developed to solve the above-described problems, and an object of the present disclosure is to provide a method for efficiently manufacturing a 3D structure which is light enough to float in the air, and a 3D structure manufactured by the same method.

According to an embodiment of the present disclosure, a method for manufacturing a 3D structure includes: making a plurality of single piece molds having a same surface shape as a portion of a surface of the 3D structure; making a plurality of exterior members having the same surface as the portion of the surface of the 3D structure by using the respective single piece molds; and forming the 3D structure by connecting the plurality of exterior members.

According to an embodiment of the present disclosure, there is provided a method for manufacturing a 3D structure which is light enough to be able to float in the air in a more efficient way In addition, according to an embodiment of the present disclosure, a balance adjustment module having a weight may be installed in a 3D structure, and the 3D structure floating in the air can be moved by moving the weight. Accordingly, various motions of the 3D structure can be exhibited.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION OF EMBODIMENTS

Exemplary embodiments will now be described more fully with reference to the accompanying drawings to clarify objects, other objects, features and advantages of the present disclosure. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

The expressions such as "upper", "lower", "left", "right", "front", "rear", etc. used in the detailed descriptions to explain a relative position relationship between elements do not mean a directions or location as an absolute criterion, and are relative expressions used for convenience of explanation with reference to a corresponding drawing when the present disclosure is explained with reference to each drawing.

In the detailed descriptions, when a certain element A is referred to as being connected (or coupled, fastened, attached) to another element B, the element A may be directly connected to another element B or may be indirectly connected by the medium of a third element disposed therebetween.

In the drawings, lengths, thicknesses, or widths of elements are exaggerated for easy understanding of technical features, and a relative size of a certain element to another element may vary according to a specific embodiment.

In the detailed descriptions of the present disclosure, the singular forms "a," "an" and "the" are intended to include the plural forms as well, unless the context clearly indicates otherwise. It will be further understood that the terms "include," "configured with" and/or "comprise," when used in this specification, do not preclude the presence or addition of one or more other components.

If the terms such as 'first' and 'second' are used to describe elements, these elements should not be limited by such terms. These terms are used for the purpose of distinguishing one element from another element only. The exemplary embodiments include their complementary embodiments.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

Figure 1:
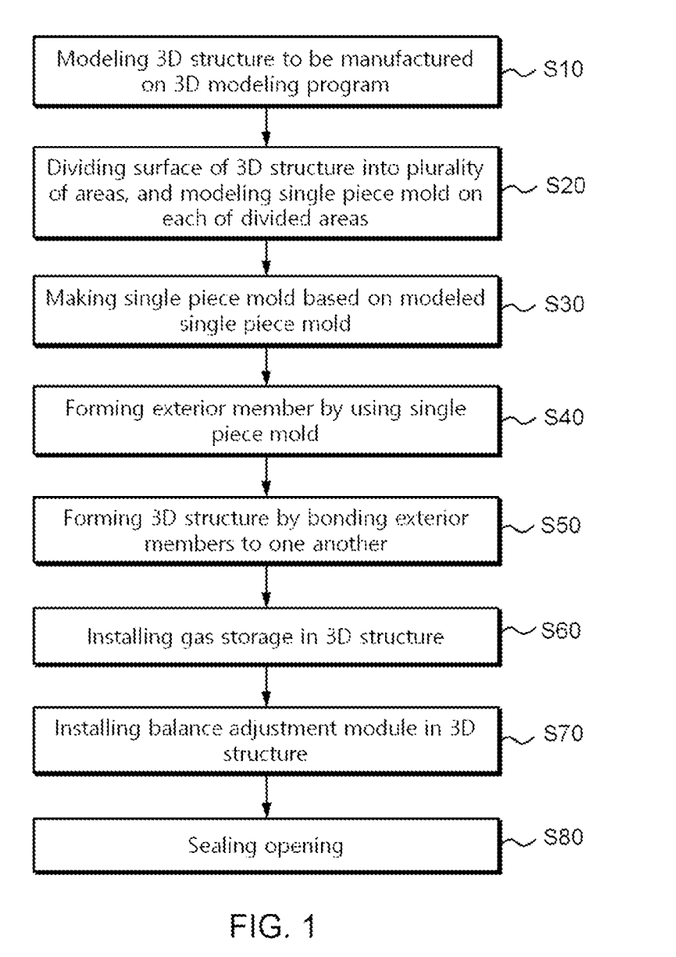
FIG. 1 is a flowchart of a method for manufacturing a floating 3D structure according to an embodiment of the present disclosure.

FIG. 1 is a flowchart of a method for manufacturing a floating 3D structure according to an embodiment of the present disclosure.

Referring to FIG. 1, the method for manufacturing the 3D structure according to an embodiment may include a step of modeling a shape of a 3D structure three-dimensionally by using a 3D modeling program (S10), a step of dividing a surface of the 3D structure into a plurality of areas on the 3D modeling program, and modeling a single piece mold for each of the divided areas (S20), a step of making a single piece mold by using a material such as synthetic resin, etc., based on the single piece mold modeled on the computer program (S30), a step of making a plurality of exterior members having the same surface shape as a portion of a surface of the 3D structure by using the respective single piece molds (S40), and a step of forming the 3D structure by bonding the plurality of exterior members (S50). In addition, the method may further include a step of forming an opening on a portion of the surface of the 3D structure manufactured as described above to fluidly communicate with an inner space, and of installing a gas storage in the inner space of the 3D structure through the opening (S60), and/or a step of installing a balance adjustment module in the inner space of the 3D structure (S70). Finally, the 3D structure may be completed by sealing the opening (S80).

In a specific embodiment, at step S10, the 3D structure to be manufactured is modeled on a computer by using a 3D modeling program. For example, the shape of the 3D structure may be expressed three-dimensionally on a computer by using a 3D program such as "Zbrush" or "Blender" and may be modeled.

Next, at step S20, the surface of the 3D structure is divided into a plurality of areas on a 3D modeling program, and a single piece mold for each of the divided areas is modeled. The 3D modeling program used in this case may be the same program as the modeling program of step S10 or may be other programs.

Figure 2:
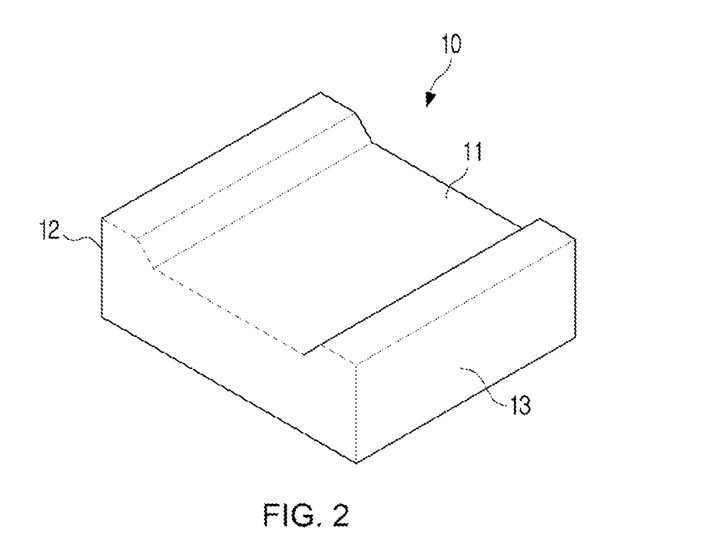
FIG. 2 is a perspective view of an exemplary 3D structure.

It is assumed that a 3D structure 10 shown in FIG. 2 is manufactured for easy understanding of the present disclosure. The 3D structure 10 of FIG. 2 has a substantially hexahedral shape and has a concavo-convex shape on an upper surface 11. To manufacture such a 3D structure 10, an exterior of the 3D structure 10 is modeled by using a 3D modeling program at step S10.

Thereafter, at step S20, an outer surface of the 3D structure 10 is divided into a plurality of areas and a single piece mold for at least some of the divided areas is modeled. The outer surface of the 3D structure may be divided into the plurality of areas for the purpose of exactly transferring the same concavo-convex shape as the concavo-convex shape of the surface of the single piece mold to a light panel of polystyrene at step S40, which will be described below. Therefore, if the 3D structure has a complicated step portion or unevenness on the surface, it may be preferable that the surface is divided into a plurality of areas and a single piece mold for each of the divided areas is formed. For example, since the upper surface 11 of the 3D structure 10 of FIG. 2 has a concavo-convex shape, a single piece mold for the upper surface 11 is formed. However, since a left side surface 12, a right side surface 13, a front surface, a rear surface, and a bottom surface of the 3D structure 10 of FIG. 2 are flat surfaces without unevenness or step portion, it will be understood that it is not necessary to form a single piece mold for each of the surfaces.

Figure 3:
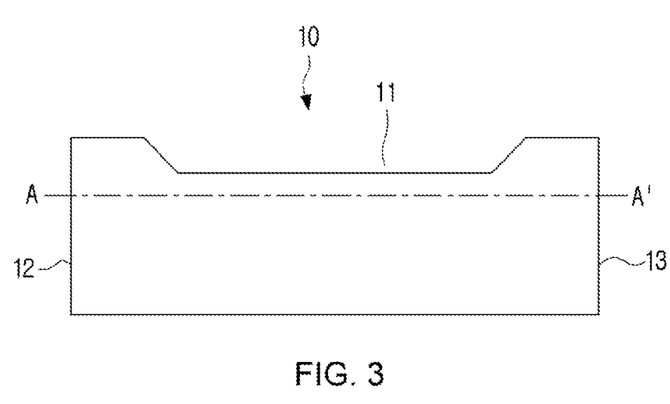
FIG. 3 is a view to explain a process of modeling a single piece mold of an exemplary 3D structure.
Figure 4A:
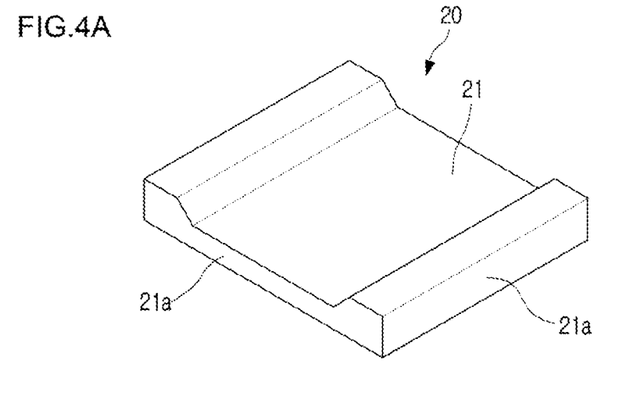
FIGS. 4A and 4B are views to explain the process of modeling the single piece mold of the 3D structure.

To form the single piece mold for the upper surface 11 of the 3D structure 10, an A-A' cross-section is set on the 3D modeling program as shown in FIG. 3 and the 3D structure 10 is cut along the cross-section, and a single piece mold 20 is modeled as shown in FIG. 4A. An upper surface 21 of the single piece mold 20 has the same concavo-convex shape as the upper surface 11 of the 3D structure 10 of FIG. 2, and accordingly, the single piece mold 20 is an embossed mold of the 3D structure 10. In the detailed descriptions, the single piece mold having the same concavo-convex shape as the concavo-convex shape of the surface of the 3D structure will be referred to as an embossed mold.

When the single piece mold 20 is modeled, a side surface 21a enclosing the upper surface 21 may be modeled as a surface (hereinafter, referred to as a "cross section") formed by vertically cutting at an edge of the upper surface 21 as shown in FIG. 4A. However, if the upper surface 21 and the side surface 21a are bent to form a large angle (for example, 90 degrees) as shown in FIG. 4A, there may be a problem that a light panel of polystyrene is broken when the light polystyrene panel is vacuum-adsorbed onto the upper surface of the single piece mold and is bent by 90 degrees on the edge of the upper surface at step 40.

Figure 4B:
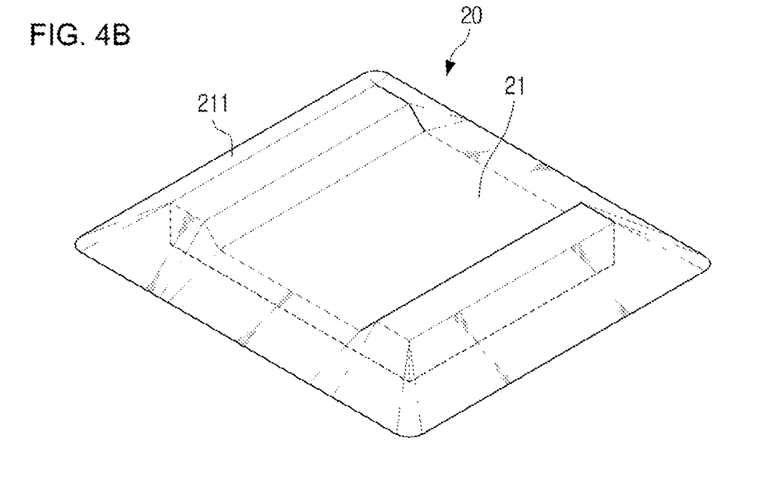

Accordingly, in an embodiment, it may be preferable to model the side surface of the single piece mold in such a shape that the side surface gently slopes downward from the edge of the upper surface. For example, FIG. 4B illustrates the single piece mold 20 having the side surface formed of a sloping portion 211. The upper surface 21 of FIG. 4B has the same concavo-convex shape as the upper surface 21 of FIG. 4A, but the side surface of FIG. 4B is not a vertically cut cross-section but the sloping portion 211 that gently slopes downward toward the outside. A slope surface of the sloping portion 211 may be a flat surface or a gently curved surface. In addition, a slope angle of the sloping portion 211 may vary according to a specific embodiment.

In an embodiment, at step S20 of modeling the single piece mold on the modeling program, a reinforcement member may be modeled along the cross-section of the single piece mold. The reinforcement member may be a member that is added to an inner surface of the 3D structure to reinforce stiffness of the 3D structure. In an embodiment, when the cross-section of the single piece mold is modeled on the modeling program, the reinforcement member may be additionally modeled by using the shape of the cross section. The reinforcement member will be described below with reference to FIGS. 8A and 8B and FIG. 9.

Figure 5:
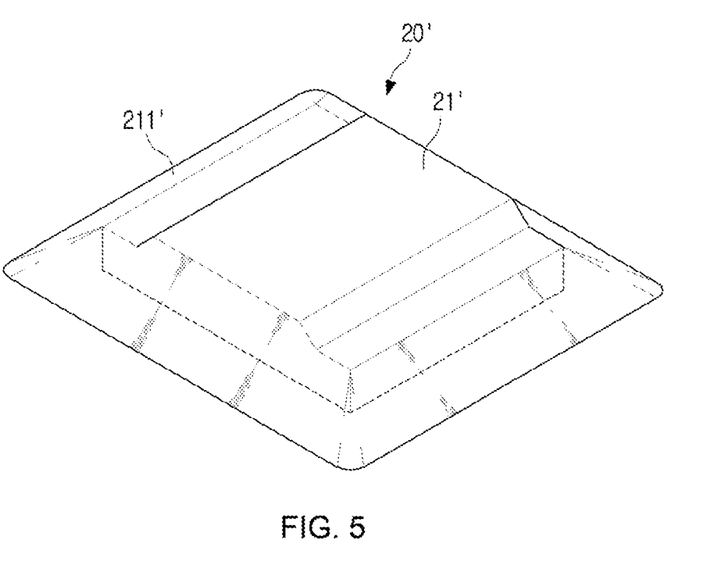
FIG. 5 is a view to explain the process of modeling the single piece mold of the 3D structure.

When the single piece mold is modeled, the single piece mold may be modeled as a "debossed" mold. For example, as shown in FIG. 3, the 3D structure 10 is cut along the A-A' cross-section on the 3D modeling program, and as shown in FIG. 5, a debossed single piece mold 20' may be modeled. An upper surface 21' of the single piece mold 20' may have the reversed concavo-convex shape of the upper surface 11 of the 3D structure 10 of FIG. 2. In the detailed descriptions, the single piece mold having the reversed concavo-convex shape of the concavo-convex shape of the surface of the 3D structure is referred to as the "debossed" mold. In addition, even when the single piece mold 20' is modeled as the debossed mold as shown in FIG. 5, a sloping portion 211' which is extended from an edge of the upper surface 21' and gently slopes downward may be modeled.

When a single piece mold is made by modeling the single piece mold as the debossed mold, there is an advantage that it is easy to attach the reinforcement member to the inner surface of the 3D structure. That is, at step S40, which will be described below, the exterior member of the 3D structure may be formed by vacuum-adsorbing a light panel of polystyrene onto the upper surface of the debossed single piece mold, and then, the reinforcement member may be attached to the exterior member being placed on the debossed single piece mold as it is. In this case, since the debossed single piece mold serves as a support to support the exterior member, an operator can easily attach the reinforcement member, so that processing efficiency can be enhanced.

In the embodiments of FIGS. 3 to 5, the upper surface 11 of the 3D structure 10 is modeled as one single piece mold 20, 20', but, if the concavo-convex shape of the upper surface of the 3D structure is complicated and it is difficult to vacuum-mold as one single piece mold, the upper surface of the 3D structure may be divided into a plurality of areas and a plurality of single piece molds may be modeled. In addition, in the embodiment of FIG. 2, the side surface and the lower surface of the 3D structure 10 are flat and single piece mold therefor are not modeled, but it will be understood that, if the side surface or the lower surface has a concavo-convex shape, a single piece mold for the surface having the concavo-convex shape may be modeled.

Referring back to FIG. 1, after one or more single piece molds are modeled for the 3D structure at step S20, a single piece mold is made according to the modeled single piece mold at step S30. For example, when one single piece mold from those illustrated in FIGS. 4A, 4B, and 5 is modeled at step S20, a real single piece mold is made with a material such as synthetic resin, etc., based on the modeled single piece mold.

In an embodiment, the single piece mold may be manually made by an operator. In another embodiment, the single piece mold may be made by using an automatic machine such as a computerized numerically controlled (CNC) machine tool. For example, data of the single piece mold modeled on the 3D modeling program is inputted to the CNC machine tool, and the single piece mold may be made by automatically processing synthetic resin like Styrofoam by the machine tool.

As a material used for making the single piece mold, synthetic resin like Styrofoam may be used. In an alternative embodiment, other materials such as metal, clay, plaster, etc. may be used.

When the single piece mold is made by using Styrofoam, a sanding operation using sandpaper or an air sander, and/or a coating operation for coating a coating material over the surface of the single piece mold may be additionally performed to smoothen the surface.

After the single piece mold is made at step S30, the exterior member is made by using the single piece mold at step S40. In an embodiment, the exterior member may be made in a vacuum-adsorption method by using a vacuum molding device, and in this case, the method of making the exterior member may include, for example, a step of heating a synthetic resin panel having thermoplasticity like polystyrene, etc., a step of vacuum-adsorbing the heated synthetic resin panel onto the single piece mold, and a step of forming the exterior member by cutting out an area having the same shape as the concavo-convex shape of the surface of the single piece mold from the synthetic resin panel detached from the single piece mold after being vacuum-adsorbed.

Figure 6:
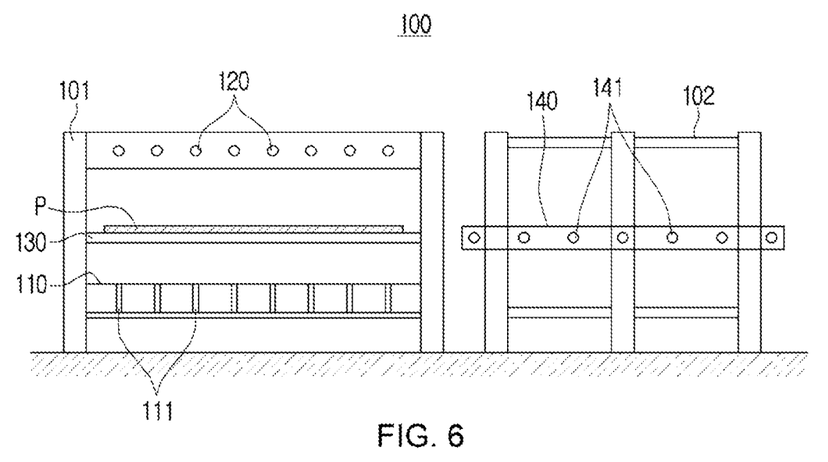
FIG. 6 is a view to explain an exterior member forming device according to an embodiment.

FIG. 6 illustrates an exemplary configuration of a vacuum molding device for making an exterior member in a vacuum-adsorption method according to an embodiment. Referring to FIG. 6, the vacuum molding device 100 according to an embodiment may include a stage 110 installed on device frames 101, 102, an upper heating portion 120, an elevation frame 130, and a sliding portion 140. The stage 110 is a member for placing and supporting the single piece mold thereon, and includes adsorption nozzles 111 formed at regular intervals. The adsorption nozzles 111 may be connected to equipment for vacuum-adsorbing such as a vacuum pump or the like, and it will be understood that the equipment is omitted.

The upper heating portion 120 is a heating device for heating a panel P of polystyrene, and may include infrared lamps or heating lines installed at predetermined intervals.

The elevation frame 130 is a frame that fixes the panel P and moves up and down. In an embodiment, the elevation frame 130 may include one or more fixing means (not shown) for fixing an edge of the panel P to the elevation frame 130. The elevation frame 130 may be configured to move up and down. For example, the elevation frame 130 may move up and down by a moving means such as a linear motor or the like, and it will be understood that the elevation device is omitted from FIG. 6.

The sliding portion 140 is a member that is installed in the frame 102, and is installed to be slidable automatically or manually in the horizontal direction. Devices for sliding the sliding portion 140, such as rollers or rails, may be installed in the frame 102, and it will be understood that the devices are omitted from FIG. 6.

The sliding portion 140 includes a lower heating portion 141. The lower heating portion 141 is a heating device for heating a lower surface of the panel P, and may include infrared lamps or heating lines installed at predetermined intervals.

The panel P is a material used for making a 3D structure, and may use light synthetic resin to be able to make the 3D structure float in the air. In an embodiment, as the panel P, a polystyrene (PS) panel may be used and the panel P may have a thickness of 2 mm to 10 mm. In an alternative embodiment, other synthetic resin materials such as polyethylene (PE), polypropylene (PP), acrylonitrile-butadiene-styrene (ABS), may be used, and in this case, the thickness of the panel may vary according to a specific embodiment.

Figure 7A:
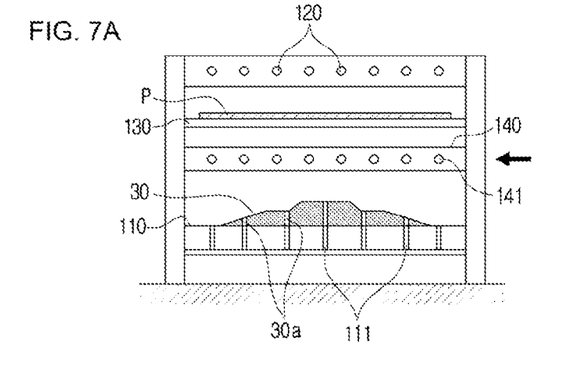
FIGS. 7A, 7B, and 7C are views to explain a method for forming an exterior member according to an embodiment.
Figure 7B:
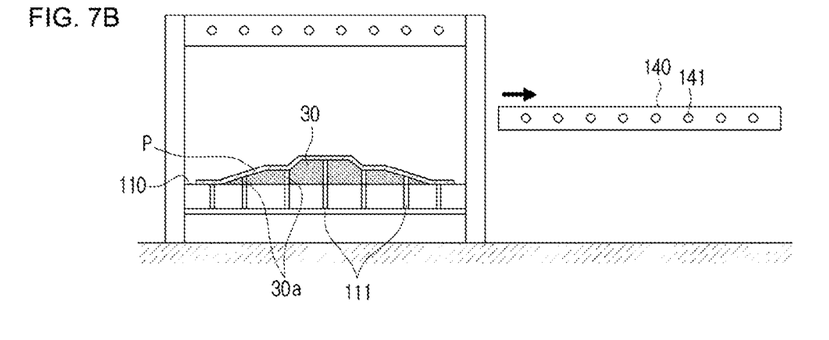
Figure 7C:
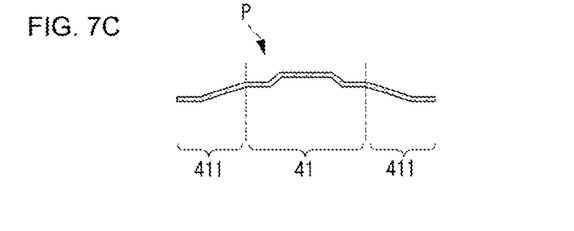

FIGS. 7A, 7B, and 7C are views schematically illustrating a process of making the exterior member by using the above-described vacuum-molding device 100. Referring to FIG. 7A, the panel P is fixed to the elevation frame 130, and the elevation frame 130 is moved up and is positioned under the upper heating portion 120. The sliding portion 130 is moved and is positioned under the elevation frame 130, and then, the upper surface and the lower surface of the panel P are heated by using the upper heating portion 120 and the lower heating portion 141, simultaneously. By heating both surfaces of the panel P, not one surface, both surfaces of the panel P have sufficient elasticity, and accordingly, the panel P is easy to deform according to the shape of the single piece mold when the panel P is vacuum-adsorbed, and a damage to the panel P can be prevented when the panel P is deformed.

In an embodiment, if a polystyrene panel P is used, the panel P may be heated at a temperature of 60° C. to 70° C. for 1-3 minutes. However, a heating temperature and a temperature maintaining time may be changed according to a type or thickness of the panel.

At the step of FIG. 7A, a single piece mold 30 is placed on the stage 110 and fixed. The single piece mold 30 of FIG. 7A is a real mold that is made based on the debossed single piece mold 20' (FIG. 5) modeled on the 3D modeling program. In an embodiment, a plurality of communication holes 30a may be formed on the single piece mold 30. The communication hole 30a is a penetrating hole penetrating through the single piece mold 30 in the vertical direction, and preferably, is formed on a position fluidly communicating with the adsorption nozzle 111 of the stage 110. Accordingly, when the single piece mold 30 is placed on the stage 110, an adsorption force of the adsorption nozzle 111 may be exerted to the upper surface of the single piece mold 30.

Next, after both surfaces of the panel P are sufficiently heated, the sliding portion 140 may be slid and moved to the outside of the frame 101 as shown in FIG. 7B. Thereafter, the elevation frame 130 may be moved down and may press the upper surface of the single piece mold 30 with the panel P, and vacuum-adsorption is initiated. An adsorption force may be exerted to the panel P through the adsorption nozzles 111 and the communication holes 30a, and the panel P which has sufficient flexibility by being heated comes close contact with the surface of the single piece mold 30, and the same concavo-convex shape as the concavo-convex shape of the upper surface of the single piece mold 30 is transferred to the panel P.

In this case, since the side surface of the single piece mold 30 is formed as a sloping surface, not as a vertically cut cross section, the panel P adsorbed onto the surface of the single piece mold 30 can be prevented from being steeply bent and thus a damage to the panel P can be prevented.

Next, when the vacuum-adsorption is finished and the panel P adsorbed onto the single piece mold 30 is detached, the panel P having the cross section as shown in FIG. 7C may be obtained. In this case, a middle portion 41 of the panel P has the same concavo-convex shape as the upper surface of the single piece mold 30, and areas 411 having the same shapes as the sloping portions of the single piece mold 30 may be formed on the periphery of the middle portion 41. Accordingly, the exterior member 41 may be made by cutting and removing the peripheral areas 411.

Figure 8A:
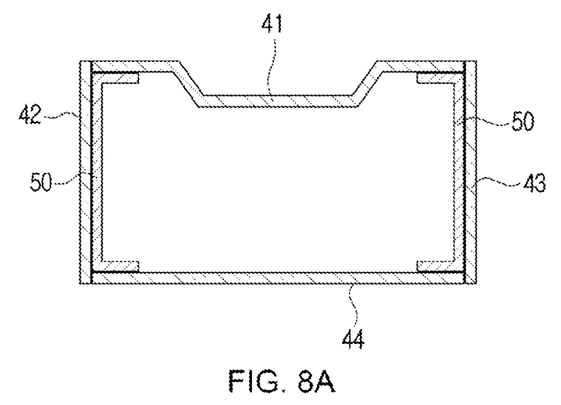
FIGS. 8A and 8B are views to explain a method for forming a 3D structure by connecting exterior members.

According to the above-described method, a corresponding exterior member may be made for each of one or more single piece molds, and after that, at step S50, the 3D structure may be manufactured by bonding the exterior members. FIG. 8A schematically illustrates forming a 3D structure by connecting a plurality of exterior members 41, 42, 43, 44. The exterior member 41 in the embodiment of FIG. 8A is an exterior member that is made by vacuum-molding in the method described above with reference to FIG. 7. Since the other exterior members 42, 43, 44 have flat surfaces without unevenness, the exterior members 42, 43, 44 may be made simply by cutting the panel P.

The exterior members may be bonded with one another by bringing edges (corners) of the neighboring exterior members into contact with one another and then bonding the contacting portions by using an adhesive or a tape. In an embodiment, a plurality of reinforcement members 50 may be attached to inner surfaces of the exterior members. The reinforcement members 50 may be members for enhancing stiffness of the exterior members and may be installed on the inner surfaces of the exterior members at regular intervals when necessary.

Figure 8B:
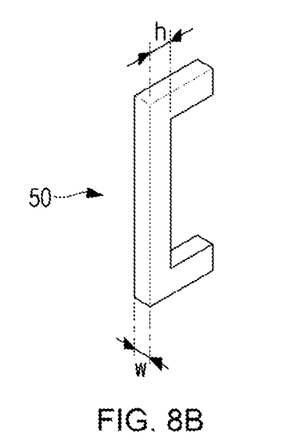

There is no limit to a material of the reinforcement member 50, but in an embodiment, the same or similar material as or to that of the exterior members 41, 42, 43, 44, for example, a synthetic resin material, may be used. Referring to FIG. 8B, the reinforcement member 50 may have a thickness w of 5 mm-10 mm and may have a height h of 1 cm-3 cm. However, the thickness and the height of the reinforcement member 50 may fall out of the above-described ranges according to a specific embodiment.

In an embodiment, the plurality of reinforcement members 50 may be arranged and attached in parallel with the inner surfaces of the exterior members 41, 42, 43, 44 or may be attached crisscross one another, thereby enhancing stiffness of the exterior members.

In an embodiment, the reinforcement members 50 may be bonded to the exterior members 41, 42, 43, 44 by an adhesive or a tape, and urethane foam may be coated along bonding portions between the reinforcement members 50 and the exterior members. The urethane foam may be solidified in the form of foam as time is elapsed and has strong adhesiveness and waterproofness, and may further enhance stiffness of the 3D structure. In addition, surface stiffness of the 3D structure can be enhanced by thinly coating an outer surface or an inner surface of the 3D structure with a coating material after the 3D structure is manufactured by bonding the exterior members.

In order to make the 3D structure float in the air after the 3D structure is manufactured according to steps S10 to S50 described above, a step of installing a gas storage in the 3D structure (S60) may further be performed.

Figure 9:
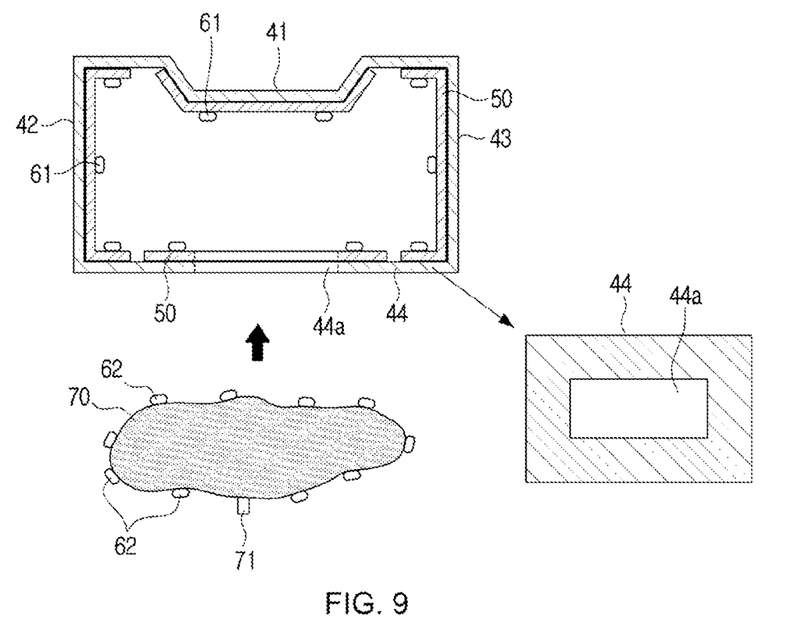
FIG. 9 is a view to explain an exemplary method for installing a gas storage in a 3D structure.

Referring to FIG. 9, the gas storage 70 may include one or more balloons to fill an inner space of the 3D structure at least in part. To install the gas storage 70 in the 3D structure, an insertion hole 44a may be formed on one of the exterior members (the lower exterior member 44 of the 3D structure in FIG. 9). The gas storage 70 may be inserted through the insertion hole 44a and may be installed in the 3D structure, and gas lighter than air, such as helium gas, may be injected into the gas storage 70 and then the insertion hole 44a is covered by a cover.

In an embodiment, the gas storage 70 may be fixed to an inside of the 3D structure by a fixing means such as a magnet not to move in the 3D structure. In the embodiment of FIG. 9, a plurality of first magnetic substances 61 may be installed on predetermined positions of the inner space of the 3D structure, and a plurality of second magnetic substances 71 may be installed on an outer surface of the gas storage 70 to be coupled with the first magnetic substances by a magnetic force. The magnetic substance may use a neodymium magnet which is light and has a strong magnetic force. In an alternative embodiment, the gas storage 70 may be fixed to the inside of the 3D structure by using a certain well-known fixing means instead of the magnetic substance.

The gas storage 70 may include two or more balloons to fill the inner space of the 3D structure. Each balloon may be disposed on each of divided areas of the inner space of the 3D structure and fixed thereto. The plurality of balloons are installed on areas in the large 3D structure, so that it is easy to manufacture the gas storage 70 and the 3D structure can be made to float in the air for a long time.

In an embodiment, after the 3D structure is manufactured according to steps S10 to S50, a step of installing a balance adjustment module in the 3D structure (S70) may further be performed. The balance adjustment module may serve to shift the center of gravity of the 3D structure when the 3D structure floats in the air, and to make the 3D structure movable.

Figure 10:
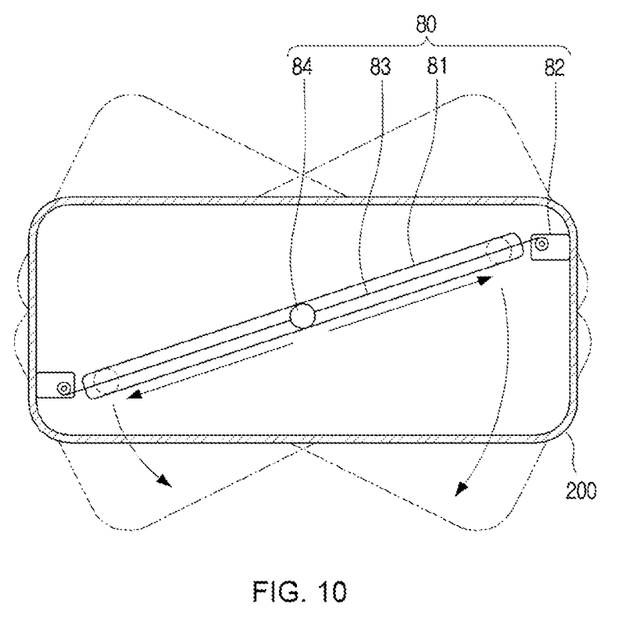
FIG. 10 is a view to explain an exemplary configuration of a balance adjustment module installed in a 3D structure.

FIG. 10 schematically illustrates a 3D structure 200 of a certain shape and an exemplary balance adjustment module 80 installed in an inner space of the 3D structure 200. Referring to FIG. 10, the balance adjustment module 80 according to an embodiment may include a case 81, a motor 82, a cable 83, and a weight 84.

The weight 84 may be a metal member having a predetermined weight, and may be integrally coupled to the cable 83. The cable 83 and the weight 84 may be disposed in the tubular case 81. Both ends of the cable 83 are wound around one pair of rollers.

In an embodiment, one of the one pair of rollers may be coupled to the motor 82 and may be rotated by the motor 82, such that the cable 83 is wound and/or unwound and the weight 84 is moved within the case 81.

In an embodiment, the balance adjustment module 80 may further include a battery and a communication unit although they are not illustrated in the drawing. The battery may supply power to the motor 82 and the communication unit, and the communication unit may communicate with an external wireless controller. Accordingly, an operator may move the weight 84 by controlling the operation of the motor 82 wirelessly while the 3D structure 200 is floating in the air.

Figure 11A:
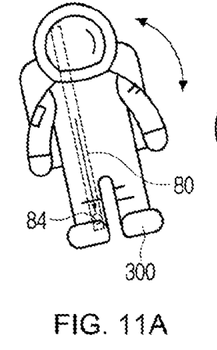
FIGS. 11A, 11B, and 11C are views to explain a motion of a 3D structure using a balance adjustment module.
Figure 11B:
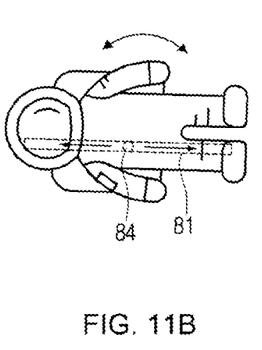
Figure 11C:
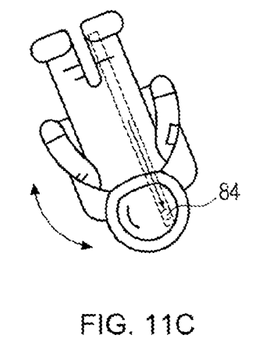

FIGS. 11A, 11B, and 11C illustrate an exemplary motion of a 3D structure using the balance adjustment module 80. In the embodiment of FIGS. 11A, 11B, and 11C, the case of the adjustment module 80 is installed from a head portion to a foot portion of a 3D structure 300 of an astronaut shape which is floating in the air. As shown in FIG. 11A, when the weight 84 is positioned on the foot portion, the center of gravity of the 3D structure is on the foot portion, and therefore, the 3D structure 300 floats in the air like an astronaut standing straight.

When the operator remotely controls the motor 82 to move the weight 84 to a middle position of the balance adjustment module 80, the center of gravity of the 3D structure 300 is shifted to the middle position, and therefore, the astronaut lies as shown in FIG. 11B. In addition, when the operator remotely controls to move the weight 84 to the head portion of the astronaut, the center of gravity of the 3D structure 300 is shifted to the head portion and the astronaut turns and stands on his/her head as shown in FIG. 11C.

In this way, the operator may adjust and rotate the posture of the 3D structure floating in the air by shifting the position of the weight 84 by remotely controlling, and can exhibit the 3D structure in various postures, so that exhibition effect and availability of the 3D structure can be maximized.

In an alternative embodiment, a plurality of balance adjustment modules 80 may be installed in the 3D structure, and cases 81 of the respective balance adjustment modules 80 may be disposed to have different longitudinal directions. For example, three balance adjustment modules 80 may be installed in the 3D structure to intersect with one another, and in this case, three weights 84 may be controlled to move independently in longitudinal directions of the respective cases 81, so that the 3D structure can be exhibited in various postures.

In another alternative embodiment, a moving path of the weight 84 is not necessarily a straight line, and for example, the weight 84 may be configured to perform a curvilinear motion or a circular motion.

Figure 12:
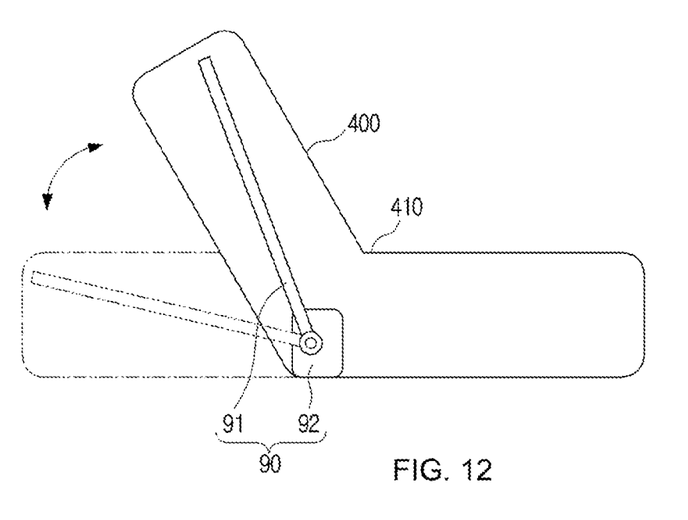
FIG. 12 is a view illustrating an exemplary configuration of a pivoting module installed in a 3D structure.

In an embodiment, after the 3D structure is manufactured according to steps S10 to S50, a step of installing a pivoting module in the 3D structure may further be performed. FIG. 12 schematically illustrates an exemplary configuration of a pivoting module 90 installed in a 3D structure 400. The 3D structure 400 may include a foldable joint area 410. It is assumed that the joint area 410 is made with a flexible material such as ethylene vinyl acetate (EVA).

In an embodiment, the pivoting module 90 may include a pivoting link 91 and a motor 92. The pivoting link 91 may be a bar-like member and may have one end directly or indirectly coupled to a driving shaft of the motor 92 and the other end fixedly coupled to a certain position in the 3D structure 400. The pivoting module 90 may further include a battery and a communication unit although they are not illustrated in the drawing, and an operator may pivot the pivoting link 91 by remotely controlling the motor 92, such that a portion of the 3D structure 400 is folded or unfolded.

While the present disclosure has been shown and described with reference to certain preferred embodiments thereof, it will be understood by those skilled in the art that various changes in form and details may be made therein without departing from the spirit and scope of the present disclosure as defined by the appended claims. Therefore, the scope of the present disclosure is defined not by the detailed descriptions of the present disclosure but by the appended claims, and all differences within the scope will be construed as being included in the present disclosure.

What is claimed is:

1. A method for manufacturing a 3D structure, the method comprising:
    making a plurality of single piece molds having a same surface shape as a portion of a surface of the 3D structure;
    making a plurality of exterior members having the same surface as the portion of the surface of the 3D structure by using the respective single piece molds;
    forming the 3D structure by connecting the plurality of exterior members; and
    installing a balance adjustment module in an inner space of the 3D structure,
    wherein the balance adjustment module comprises a weight and a cable coupled to the weight.

2. The method of claim 1, wherein forming the 3D structure further comprises bonding a plurality of reinforcement members to inner surfaces of the exterior members.

3. The method of claim 2, further comprising installing a gas storage in the inner space of the 3D structure,
    wherein the gas storage comprises one or more balloons to fill the inner space of the 3D structure at least in part.

4. The method of claim 3, wherein a plurality of first magnetic substances are installed on predetermined positions of the inner space of the 3D structure, and
    wherein a plurality of second magnetic substances are attached to an outer surface of the balloon to be coupled with the first magnetic substances by a magnetic force.

5. The method of claim 1, wherein making the exterior members comprises:
    heating an upper surface and a lower surface of a thermoplastic synthetic resin panel, simultaneously;
    vacuum-adsorbing the heated synthetic resin panel onto each of the single piece molds; and forming each of the exterior members by cutting out an area having a same shape as the surface shape of each of the single piece moldy from the synthetic resin panel.

6. The method of claim 5, wherein heating the upper surface and the lower surface of the synthetic resin panel comprises heating the synthetic resin panel at a temperature between 60° C. and 70° C. for 1-3 minutes.

7. The method of claim 1, wherein making the single piece molds comprises:
  modeling a shape of the 3D structure three-dimensionally by using a 3D modeling program;
  dividing the surface of the 3D structure into a plurality of areas and modeling a single piece mold for each of the divided areas by using a 3D modeling program; and
  making the single piece molds by using synthetic resin, based on the modeled single piece molds.

* * * * *